US009518352B2

(12) United States Patent
Pollett (10) Patent No.: US 9,518,352 B2
(45) Date of Patent: Dec. 13, 2016

(54) UNITARY BALANCE RING FOR A WASHING MACHINE APPLIANCE (71) Applicant: General Electric Company, Schenectady, NY (US)

(72) Inventor: James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 66 days.

(21) Appl. No.: 14/591,026

(22) Filed: Jan. 7, 2015

(65) Prior Publication Data

US 2016/0194800 A1  Jul. 7, 2016

(51) Int. Cl.
*F16F 15/32* (2006.01)
*D06F 37/24* (2006.01)
*B29C 67/00* (2006.01)
*B22F 3/105* (2006.01)
*B33Y 10/00* (2015.01)
*B33Y 80/00* (2015.01)

(52) U.S. Cl.
CPC .......... *D06F 37/245* (2013.01); *B22F 3/1055* (2013.01); *B29C 67/0066* (2013.01); *F16F 15/32* (2013.01); *B33Y 10/00* (2014.12); *B33Y 80/00* (2014.12)

(58) Field of Classification Search
CPC ...... D06F 37/24; D06F 37/225; D06F 37/245; B22F 3/1055; B29C 67/0066; B33Y 10/00; B33Y 80/00; F16F 15/16; F16F 15/167; F16F 15/173; F16F 15/36; F16F 15/366; F16F 15/32; Y10T 74/2109
See application file for complete search history.

(56) References Cited

U.S. PATENT DOCUMENTS

| 4,044,626 | A | * | 8/1977 | Hayashi | F16F 15/366 210/144 |
|---|---|---|---|---|---|
| 7,312,269 | B2 | | 12/2007 | Cevolini | |
| 7,617,705 | B2 | * | 11/2009 | Chang | D06F 37/225 68/23.1 |
| 8,276,406 | B2 | * | 10/2012 | Soto | D06F 7/245 68/23.2 |
| 8,286,236 | B2 | | 10/2012 | Jung et al. | |
| 8,606,389 | B2 | * | 12/2013 | Burkes | B23P 15/00 156/60 |
| 9,150,994 | B2 | * | 10/2015 | Davis | F16F 15/366 |
| 9,303,352 | B2 | * | 4/2016 | Hasanreisoglu | D06F 37/06 |
| 2004/0172987 | A1 | * | 9/2004 | Lim | D06F 37/245 68/23.1 |
| 2005/0210931 | A1 | * | 9/2005 | Contini | F16F 15/366 68/13 R |

(Continued)

FOREIGN PATENT DOCUMENTS

CN  103287191 A  9/2013
JP  5873394 A * 5/1983

Primary Examiner — Adam D Rogers
(74) Attorney, Agent, or Firm — Dority & Manning, P.A.

(57) ABSTRACT

A unitary balance ring for a washing machine appliance includes a first plurality of ribs and a second plurality of ribs positioned within a tubular body of the unitary balance ring. Each rib of the first plurality of ribs has a bottom edge that is positioned at a bottom surface of the interior volume, and each rib of the second plurality of ribs has a bottom edge that is spaced apart from the bottom surface of the interior volume.

14 Claims, 5 Drawing Sheets (56) References Cited

U.S. PATENT DOCUMENTS

| | | | |
|---|---|---|---|
| 2011/0048081 A1* | 3/2011 | Urbiola Soto | D06F 37/12 68/212 |
| 2011/0120192 A1* | 5/2011 | Song | D06F 37/245 68/23.2 |
| 2016/0101569 A1* | 4/2016 | Pollett | B29C 67/0088 264/401 |
| 2016/0160421 A1* | 6/2016 | Alexander | D06F 37/245 74/572.4 |

* cited by examiner

UNITARY BALANCE RING FOR A WASHING MACHINE APPLIANCE

FIELD OF THE INVENTION

The subject matter of the present disclosure relates generally to balance rings for appliances, such as washing machine appliances.

BACKGROUND OF THE INVENTION

During the operation of a washing machine, particularly during spin cycles, the washing machine can sometimes experience extreme vibration. These vibrations can cause displacement of the washing machine as it "walks" across a surface, such as a floor. Typically, this event is due to the different shapes and densities of the clothing or other articles that are being washed which, after a washing cycle and draining the wash basket, can stick together and cause differences in the center of mass inside the wash basket. The vibration problem can also be caused by the introduction of relatively heavier articles into the wash basket, such as shoes.

By way of example, after the washing cycle and draining the wash basket, the shoes or other, relatively heavier articles may be located on one side of the wash basket or in a manner that causes the center of mass of the combined wash basket and articles (such as the shoes, clothes, and other items being washed) to be off center. As the wash basket is rotated, particularly at high speeds, the imbalance can generate undesired strain in the washing machine components, an undesirable level of noise, and/or "walking" of the appliance. In an extreme or prolonged situation, the imbalance created by the excessive vibration can also wear-out and damage the washing machine components.

As a result, in order to counter the out of balance wash load, various devices have been proposed. For example, washing machines have been equipped with balance rings, which are typically hollow rings placed on the top of the wash basket. Inside the ring (or toroid), a weight, such as a fluid and/or movable metal objects, have been inserted. During operation, the ring will act as a counterweight to the out of balance load of clothes because the fluid and/or solid balls will move to a position within the ring that counters imbalance created by the articles in the wash basket so as to balance the overall mass of wash basket and articles within the wash basket. Thus, for balance rings that incorporate a fluid, during spinning of the wash basket the fluid must be able to redistribute so to act as a counterweight to an out of balance of mass of the articles in the wash basket.

Accordingly, a balance ring for a washing machine appliance that includes features for improved regulation of fluid flow within the balance ring would be useful.

BRIEF DESCRIPTION OF THE INVENTION

The present subject matter provides a unitary balance ring for a washing machine appliance. The unitary balance ring includes a first plurality of ribs and a second plurality of ribs positioned within a tubular body of the unitary balance ring. Each rib of the first plurality of ribs has a bottom edge that is positioned at a bottom surface of the interior volume, and each rib of the second plurality of ribs has a bottom edge that is spaced apart from the bottom surface of the interior volume. Additional aspects and advantages of the invention will be set forth in part in the following description, or may be apparent from the description, or may be learned through practice of the invention.

In a first exemplary embodiment, a unitary balance ring for a washing machine appliance is provided. The unitary balance ring includes a tubular body that defines an interior volume. A first plurality of ribs is positioned within the tubular body. Each rib of the first plurality of ribs has a bottom edge that is positioned at a bottom surface of the interior volume. A second plurality of ribs is also positioned within the tubular body. Each rib of the second plurality of ribs has a bottom edge that is spaced apart from the bottom surface of the interior volume.

In a second exemplary embodiment, a method for forming a unitary balance ring for a washing machine appliance is provided. The method includes establishing three-dimensional information of the unitary balance ring and converting the three-dimensional information of the unitary balance ring from the step of establishing into a plurality of slices. Each slice of the plurality of slices defines a respective cross-sectional layer of the unitary balance ring. The method also includes successively forming each cross-sectional layer of the unitary balance ring with an additive process. After the step of successively forming: (1) a tubular body of the unitary balance ring defines an interior volume; (2) each rib of a first plurality of ribs is positioned within the tubular body and has a bottom edge that is positioned at a bottom surface of the interior volume; and (3) each rib of a second plurality of ribs is positioned within the tubular body and has a bottom edge that is spaced apart from the bottom surface of the interior volume.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
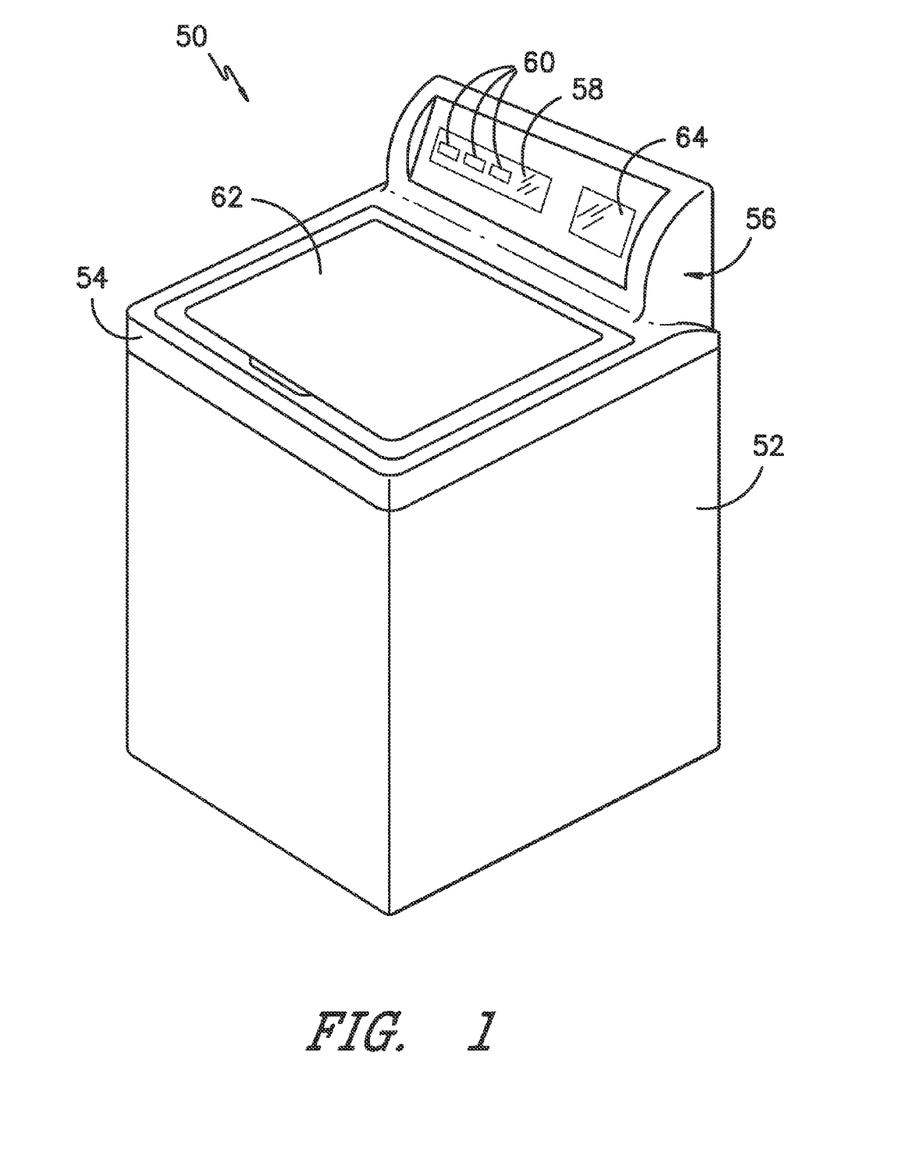
FIG. 1 provides a perspective view of a washing machine according to an exemplary embodiment of the present subject matter.
Figure 2:
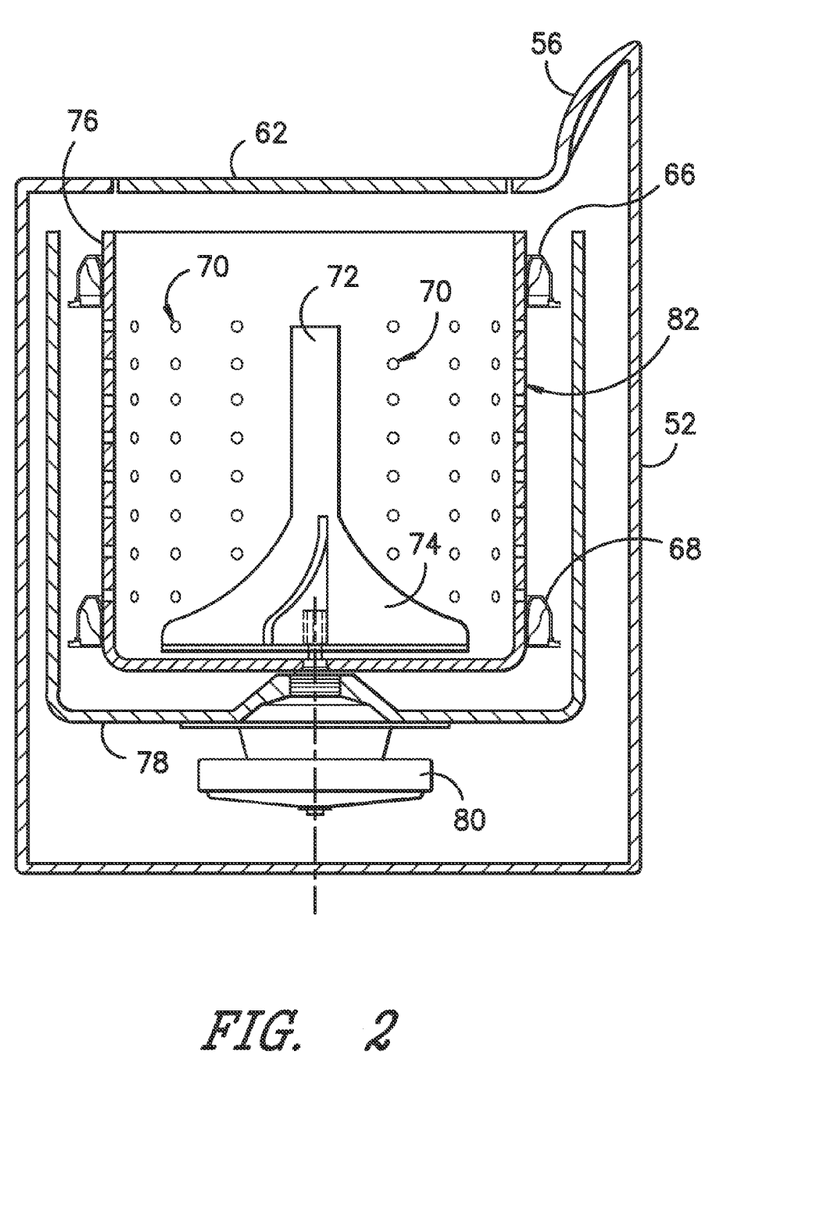
FIG. 2 provides a cross-sectional view of the exemplary washing machine appliance of FIG. 1.

FIG. 1 is a perspective view vertical axis washing machine appliance 50 according to an exemplary embodiment of the present subject matter. FIG. 2 provides a cross-sectional, side view of washing machine appliance 50. As may be seen in FIGS. 1 and 2, washing machine appliance 50 includes a cabinet 52 and a top cover 54. A backsplash 56 extends from top cover 54. A control panel 58 including a plurality of input selectors 60 is coupled to backsplash 56. Control panel 58 and input selectors 60 collectively form a user interface input for operator selection of machine cycles and features, and in one embodiment, a display 64 indicates selected features, a countdown timer, and/or other items of interest to machine users. A lid 62 is mounted to cover 54 and is rotatable about a hinge (not shown) between an open position (not shown) facilitating access to a wash tub 78 located within cabinet 52, and a closed position (shown in FIG. 1) forming an enclosure over wash tub 78.

A wash basket 76 is located within wash tub 78 in spaced apart relationship from tub 78. Articles for washing are placed within basket 76. A motor 80 is used to selectively spin wash basket 76 during various cycles of the appliance. Wash basket 76 includes a plurality of openings 70 that facilitate the movement of fluid in and out of basket 76 within wash tub 78. When wash basket 76 is rotated at high speed during e.g., a spin cycle, openings 70 in wash basket 76 allow fluid to be wrung from the articles, such as clothing located in basket 76.

An agitation element, such as agitator 72 with blades 74, impeller, auger, oscillatory basket mechanism, or some combination thereof, is disposed in basket 76 to impart an oscillatory motion to articles and liquid in basket 76 using motor 80. In different embodiments, agitation element 72 can include a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, wash basket 76 and agitation element 72 are oriented to rotate about a vertical axis A.

Operation of washing machine appliance 50 is controlled by a controller or processing device (not shown), that is operatively coupled to the user interface input or control panel 58 located on washing machine backsplash 56 (shown in FIG. 1), which allows e.g., for user manipulation to select washing machine cycles and features. More particularly, in response to user manipulation of the user interface input, the controller operates the various components of washing machine appliance 50 to execute selected machine cycles and features.

For example, in an illustrative embodiment, laundry items are loaded into basket 76, and washing operation is initiated through operator manipulation of control input selectors 60 (shown in FIG. 1). Wash tub 78 is filled with water and mixed with detergent to form a wash fluid, and contents of the basket 76 are agitated with agitation element 72 for cleansing of laundry items in basket 76. More specifically, agitation element 72 is moved back and forth in an oscillatory back and forth motion.

After the agitation phase of the wash cycle is completed, wash tub 78 can be drained with a pump assembly (not shown). Laundry items are then rinsed and portions of the cycle repeated, including the agitation phase, depending on the particulars of the wash cycle selected by a user. One or more spin cycles may also be used. In particular, a spin cycle may be applied after the wash cycle and/or after the rinse cycle in order to wring wash fluid from the articles being washed. During a spin cycle, wash basket 76 is rotated at relatively high speeds.

While described in the context of a specific embodiment of vertical axis washing machine appliance 50, using the teachings disclosed herein it will be understood that vertical axis washing machine appliance 50 is provided by way of example only. Other washing machine appliances having different configurations, different appearances, and/or different features may also be utilized with the present subject matter as well.

As previously described, articles inside basket 76 may cause an imbalance leading to undesirable vibrations or movement of washing machine appliance 50 during operation. Accordingly, for this exemplary embodiment, washing machine appliance 50 is equipped with balance rings 66 and 68 that operate to counteract imbalances in the wash load placed into wash basket 76. Balance rings 66 and 68 are shown in cross section in FIG. 2 but should be understood to extend circumferentially about wash basket 76. For this exemplary embodiment, balance rings 66 and 68 are mounted to an exterior surface 82 of wash basket 76 but other techniques for positioning on basket 76 may also be used. Also, although shown with a balance ring positioned at both a top and bottom of wash basket 76, it should be understood that only one such balance ring—particularly at the top of wash basket 76 as with balance ring 66—may be used in other exemplary embodiments of the present subject matter. Balance rings 66 and 68 may include features for controlling the movement of a fluid in such rings that offsets an imbalance of articles in wash basket 76.

Figure 3:
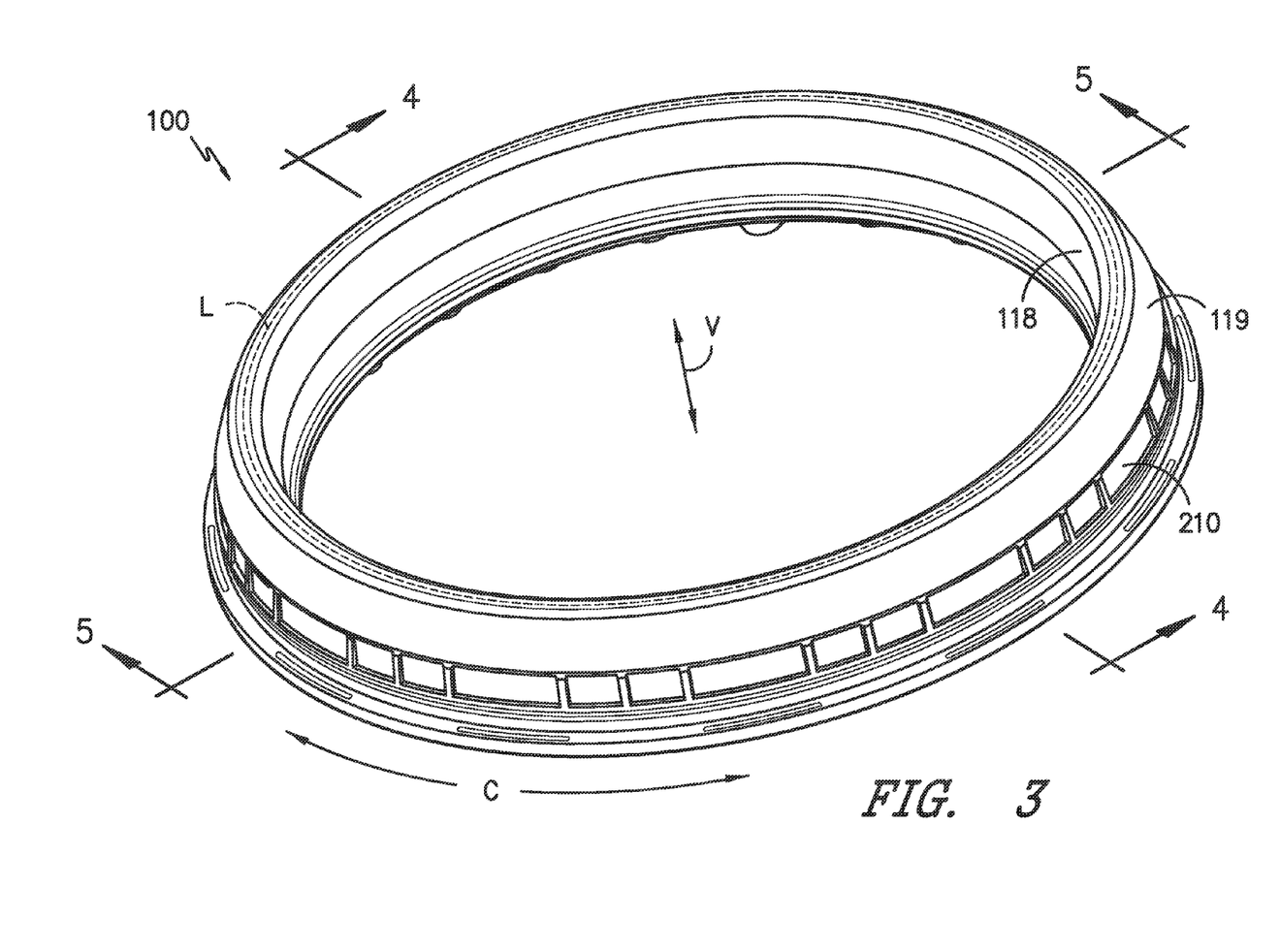
FIG. 3 provides a perspective view of a unitary balance ring according to an exemplary embodiment of the present subject matter.
Figure 4:
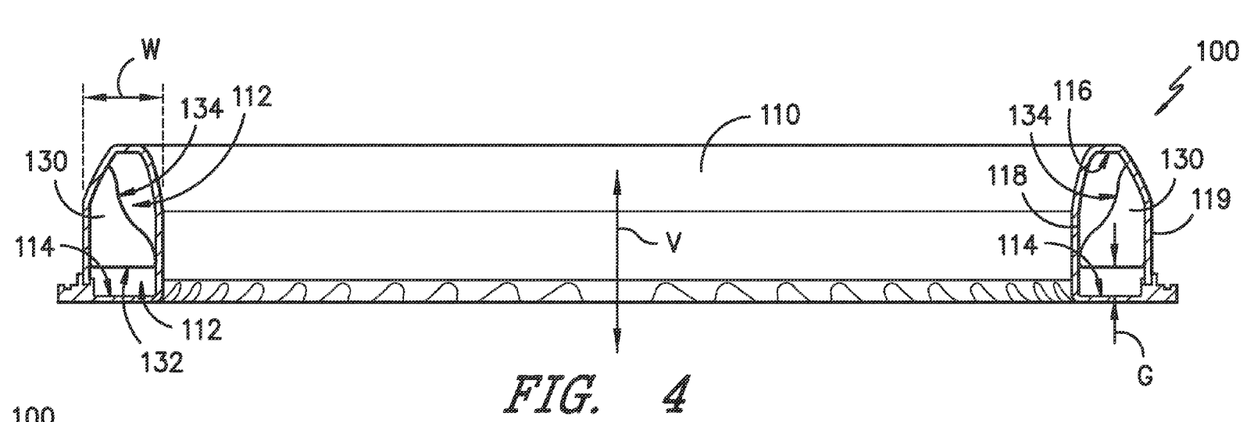
FIG. 4 provides a section view of the exemplary unitary balance ring of FIG. 3 taken along the 4-4 line of FIG. 3.
Figure 5:
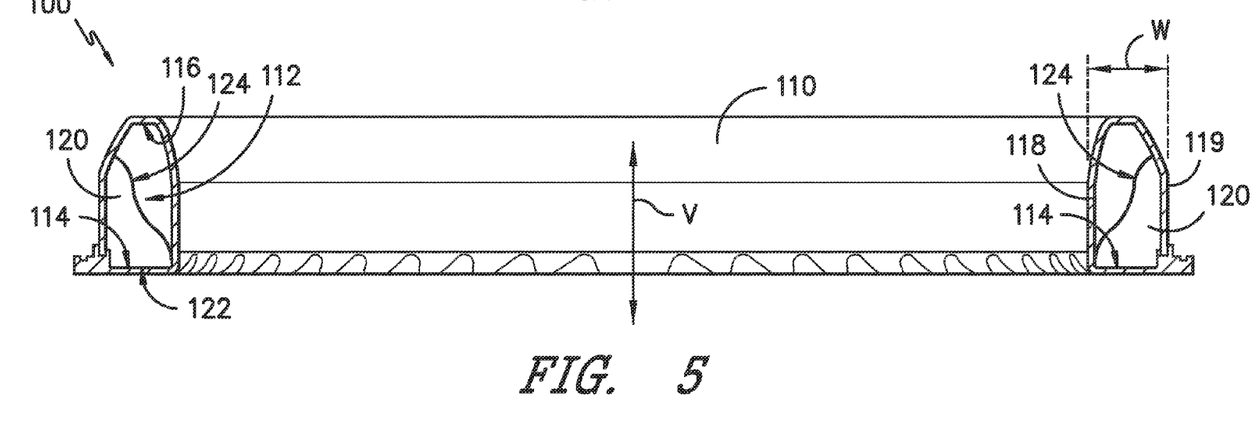
FIG. 5 provides a section view of the exemplary unitary balance ring of FIG. 3 taken along the 5-5 line of FIG. 3.

FIG. 3 provides a perspective view of a unitary balance ring 100 according to an exemplary embodiment of the present subject matter. FIG. 4 provides a section view of unitary balance ring 100 taken along the 4-4 line of FIG. 3, and FIG. 5 provides a section view of unitary balance ring 100 taken along the 5-5 line of FIG. 3. Unitary balance ring 100 may be used in any suitable appliance. For example, unitary balance ring 100 may be used in washing machine appliance 50 as one of balance rings 66 and 68 (FIG. 2). Unitary balance ring 100 and formation of unitary balance ring 100 are discussed in greater detail below.

As may be seen in FIGS. 3, 4 and 5, unitary balance ring 100 includes a tubular body 110, a first plurality of baffles or ribs 120, and a second plurality of baffles or ribs 130. Tubular body 110, first ribs 120, and second ribs 130 may be integrally formed of a single continuous piece of material, such as a plastic or metal, in order to form unitary balance ring 100. Thus, unitary balance ring 100 may be formed of a single continuous piece of material, such as a plastic or metal, filed with a fluid. Tubular body 110 defines an interior volume 112. Interior volume 112 of tubular body 110 may extend about tubular body 110 along a circumferential direction C such that interior volume 112 has an annular or toroid shape within tubular body 110.

First ribs 120 are positioned within tubular body 110, e.g., within interior volume 112 of tubular body 110. Each of first ribs 120 has a bottom edge 122. Bottom edge 122 of first ribs 120 may be positioned at a bottom surface 114 of interior volume 112 of tubular body 110. Thus, bottom edge 122 of first ribs 120 may be positioned on or in contact with bottom surface 114 of interior volume 112. Each rib of first ribs 120 may also extend across a width W of interior volume 112 of tubular body 110, e.g., from an inner sidewall 118 of tubular body 110 to an outer sidewall 119 of tubular body 110.

Each rib of first ribs 120 also includes a top edge 124. Top edge 124 of first ribs 120 may be spaced apart from a top surface 116 of interior volume 112. Thus, top edge 124 of first ribs 120 may not be positioned on or contact top surface 116 of interior volume 112, as shown in FIG. 5. Top edge 124 of first ribs 120 may have any suitable shape. For example, top edge 124 of first ribs 120 may be curved such that top edge 124 of first ribs 120 slopes upwardly from inner sidewall 118 of tubular body 110 towards outer sidewall 119 of tubular body 110 and/or an end portion of top edge 124 of first ribs 120 is positioned at or adjacent bottom surface 114 of interior volume 112, as shown in FIG. 5. In particular, top edge 124 of first ribs 120 may be positioned at or adjacent bottom surface 114 of interior volume 112 at inner sidewall 118 of tubular body 110, and top edge 124 of first ribs 120 may be spaced apart from bottom surface 114 of interior volume 112 at an outer sidewall 119 of tubular body 110. In alternative exemplary embodiments, top edge 124 of first ribs 120 may be level or linear.

Second ribs 130 are also positioned within tubular body 110, e.g., within interior volume 112 up tubular body 110. Each rib of second ribs 130 has a bottom edge 132. Bottom edge 132 of second ribs 130 is spaced apart from bottom surface 114 of interior volume 112. Thus, e.g., bottom edge 132 of second ribs 130 and bottom surface 114 of interior volume 112 may define a gap G therebetween along the vertical direction V. The gap G may have any suitable height. For example, the gap G may be at least an eighth of an inch along the vertical direction V. Each rib of second ribs 130 may also extend across the width W of interior volume 112.

Each rib of second ribs 130 also includes a top edge 134. Top edge 134 of second ribs 130 may be spaced apart from top surface 116 of interior volume 112. Thus, top edge 134 of second ribs 130 may not be positioned on or contact top surface 116 of interior volume 112, as shown in FIG. 4. Top edge 134 of second ribs 130 may have any suitable shape. For example, top edge 134 of second ribs 130 may be curved such that top edge 134 of second ribs 130 slopes upwardly from inner sidewall 118 of tubular body 110 towards outer sidewall 119 of tubular body 110. In alternative exemplary embodiments, top edge 134 of second ribs 130 may be level or linear.

By positioning first ribs 120 and second ribs 130 in the manner described above, fluid within interior volume 112 may flow below second ribs 130 but not first ribs 120, and fluid within interior volume 112 may flow over both first ribs 120 and second ribs 130. As will be understood by those skilled in the art, fluid flow within interior volume 112 may assist with balancing an associated wash basket. In particular, a distribution of fluid within interior volume 112 may be regulated by first ribs 120 and second ribs 130 during rotation of the associated wash basket in order to assist with balancing the associated wash basket. Any suitable fluid may be sealed within interior volume 112 of tubular body 110. For example, the fluid within interior volume 112 of tubular body 110 may be a solution of calcium chloride and water.

First ribs 120 and second ribs 130 may be distributed within interior volume 112 in any suitable manner. For example, ribs of first ribs 120 may be uniformly spaced from one another along a length of tubular body 110. In particular, ribs of first ribs 120 may be uniformly distributed along a circumferential direction C within interior volume 112 of tubular body 110. As another example, ribs of second ribs 130 may be uniformly spaced apart from one another along the length of tubular body 110. In particular, ribs of second ribs 130 may be uniformly distributed along the circumferential direction C within interior volume 112 of tubular body 110. Each rib of first ribs 120 and second ribs 130 may also be staggered between each other. Thus, e.g., each rib of first ribs 120 may be positioned between a respective pair of second ribs 130, and each rib a second ribs 130 may be positioned between a respective pair of first ribs 120. Such distribution of first and second ribs 130 may assist with regulating fluid flow within interior volume 112 of tubular body 110.

Figure 6:
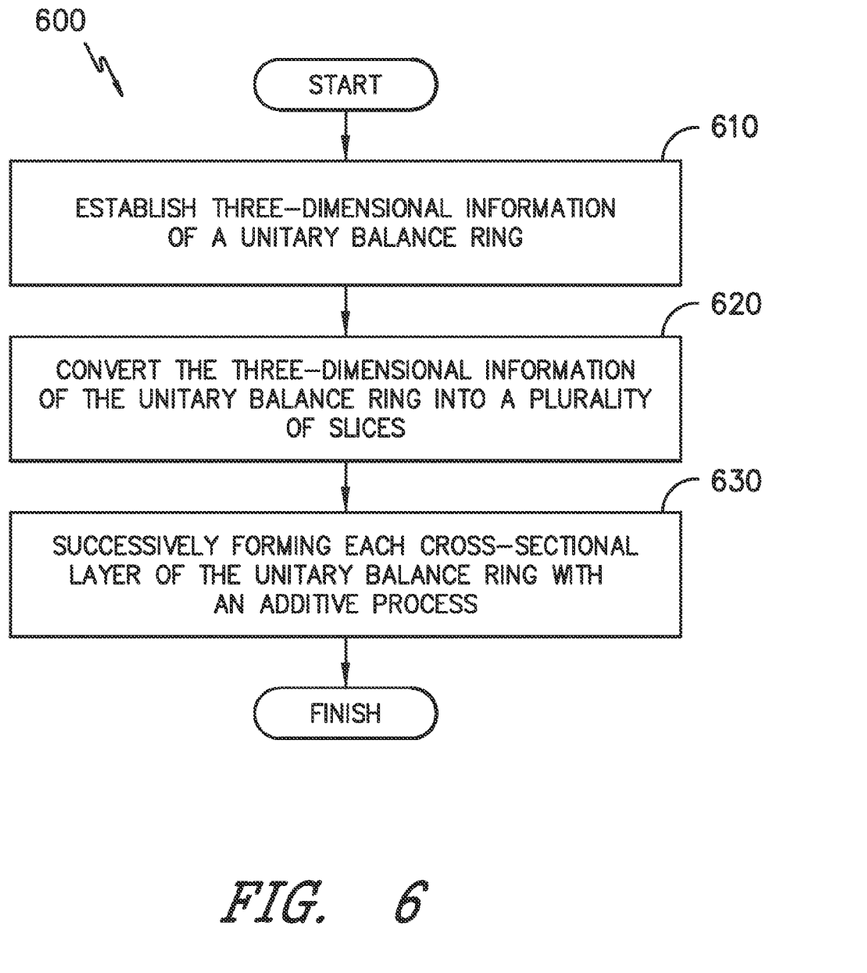
FIG. 6 illustrates a method for forming a unitary balance ring according to an exemplary embodiment of the present subject matter.

FIG. 6 illustrates a method 600 for forming a unitary balance ring according to an exemplary embodiment of the present subject matter. Method 600 may be used to form any suitable balance ring. For example, method 600 may be used to form balance ring 100 (FIG. 3). Method 600 permits formation of various features of balance ring 100, as discussed in greater detail below. Thus, method 600 is discussed in greater detail below with reference to balance ring 100.

Method 600 includes fabricating balance ring 100 as a unitary balance ring, e.g., such that balance ring 100 is formed of a single continuous piece of plastic, metal or other suitable material. More particularly, method 600 includes manufacturing or forming balance ring 100 using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 610, three-dimensional information of balance ring 100 is determined. As an example, a model or prototype of balance ring 100 may be scanned to determine the three-dimensional information of balance ring 100 at step 610. As another example, a model of balance ring 100 may be constructed using a suitable CAD program to determine the three-dimensional information of balance ring 100 at step 610. At step 620, the three-dimensional information is converted into a plurality of slices that each defines a cross-sectional layer of balance ring 100. As an example, the three-dimensional information from step 610 may be divided into equal sections or segments, e.g., along a central axis of opening 202 or any other suitable axis. Thus, the three-dimensional information from step 610 may be discretized at step 620, e.g., in order to provide planar cross-sectional layers of balance ring 100.

After step 620, balance ring 100 is fabricated using the additive process, or more specifically each layer is successively formed at step 630, e.g., by fusing or polymerizing a plastic using laser energy or heat. The layers may have any suitable size. For example, each layer may have a size between about five ten-thousandths of an inch and about one thousandths of an inch. Balance ring 100 may be fabricated using any suitable additive manufacturing machine as step 630. For example, any suitable laser sintering machine, inkjet printer or laserjet printer may be used at step 630.

Utilizing method 600, balance ring 100 may have fewer components and/or joints than known balance rings. Specifically, balance ring 100 may require fewer components because balance ring 100 may be a single piece of continuous plastic or metal, e.g., rather than multiple pieces of plastic or metal joined or connected together. In addition, method 600 may permit formation of first ribs 120 and second ribs 130 within a sealed or unitary tubular body 110. As a result, balance ring 100 may provide improved vibration damping of wash basket 120. Also, balance ring 100 may be less prone to leaks and/or be stronger when formed with method 600.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A unitary balance ring for a washing machine appliance, comprising:
    a tubular body defining an interior volume;
    first plurality of ribs positioned within the tubular body, each rib of the first plurality of ribs having a bottom edge that is positioned at a bottom surface of the interior volume, in contact with the bottom surface across an entire width of the interior volume; and
    a second plurality of ribs positioned within the tubular body, each rib of the second plurality of ribs having a bottom edge that is spaced apart from the bottom surface of the interior volume, wherein the bottom edge of each rib of the second plurality of ribs and the bottom surface of the interior volume define a gap along a vertical direction, the gap being at least an eighth of an inch.

2. The unitary balance ring of claim 1, wherein each rib of the first plurality of ribs is positioned between a respective pair of ribs of the second plurality of ribs.

3. The unitary balance ring of claim 2, wherein the ribs of the first and second pluralities of ribs are uniformly spaced along a length of the tubular body.

4. The unitary balance ring of claim 1, wherein the ribs of the first plurality of ribs are uniformly spaced from one another along a length of the tubular body.

5. The unitary balance ring of claim 4, wherein the ribs of the second plurality of ribs are uniformly spaced from one another along the length of the tubular body.

6. The unitary balance ring of claim 1, wherein each rib of the first plurality of ribs has a top edge that is spaced apart from a top surface of the interior volume, each rib of the second plurality of ribs also having a top edge that is spaced apart from the top surface of the interior volume.

7. The unitary balance ring of claim 6, further comprising a fluid sealed within the interior volume of the tubular body.

8. The unitary balance ring of claim 1, wherein the tubular body, the first plurality of ribs and the second plurality of ribs are integrally formed of a single continuous piece of material.

9. A method for forming a unitary balance ring for a washing machine appliance, comprising:
    establishing three-dimensional information of the unitary balance ring;
    converting the three-dimensional information of the unitary balance ring from said step of establishing into a plurality of slices, each slice of the plurality of slices defining a respective cross-sectional layer of the unitary balance ring; and
    successively forming each cross-sectional layer of the unitary balance ring with an additive process;
    wherein, after said step of successively forming: (1) a tubular body of the unitary balance ring defines an interior volume; (2) each rib of a first plurality of ribs is positioned within the tubular body and has a bottom edge that is positioned at a bottom surface of the interior volume, in contact with the bottom surface across an entire width of the interior volume; and (3) each rib of a second plurality of ribs is positioned within the tubular body and has a bottom edge that is spaced apart from the bottom surface of the interior volume, wherein the bottom edge of each rib of the second plurality of ribs and the bottom surface of the interior volume define a gap along a vertical direction, the gap being at least an eighth of an inch.

10. The method of claim 9, wherein the additive process comprises at least one of fused deposition modeling, selective laser sintering, stereolithography, and digital light processing.

11. The method of claim 9, wherein each rib of the first plurality of ribs is positioned between a respective pair of ribs of the second plurality of ribs after said step of successively forming.

12. The method of claim 9, wherein the ribs of the first and second pluralities of ribs are uniformly spaced along a length of the tubular body after said step of successively forming.

13. The method of claim 9, further comprising directing a fluid into the interior volume of the tubular body and sealing the fluid within the interior volume of the tubular body during said step of successively forming.

14. The method of claim 9, wherein the tubular body, the first plurality of ribs and the second plurality of ribs are integrally formed of a single continuous piece of material after said step of successively forming.

* * * * *